H. B. SCHMIDT.
JEWELER'S TOOL.
APPLICATION FILED MAY 17, 1917.
1,240,783.
Patented Sept. 18, 1917.
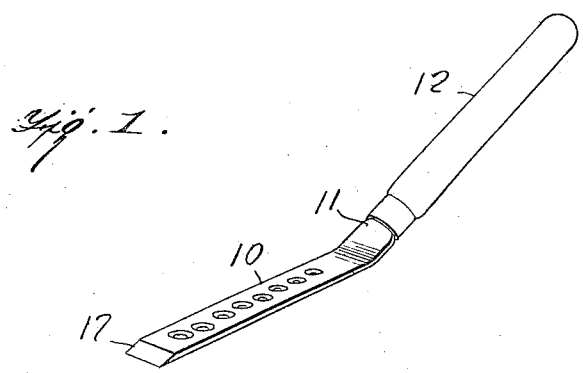
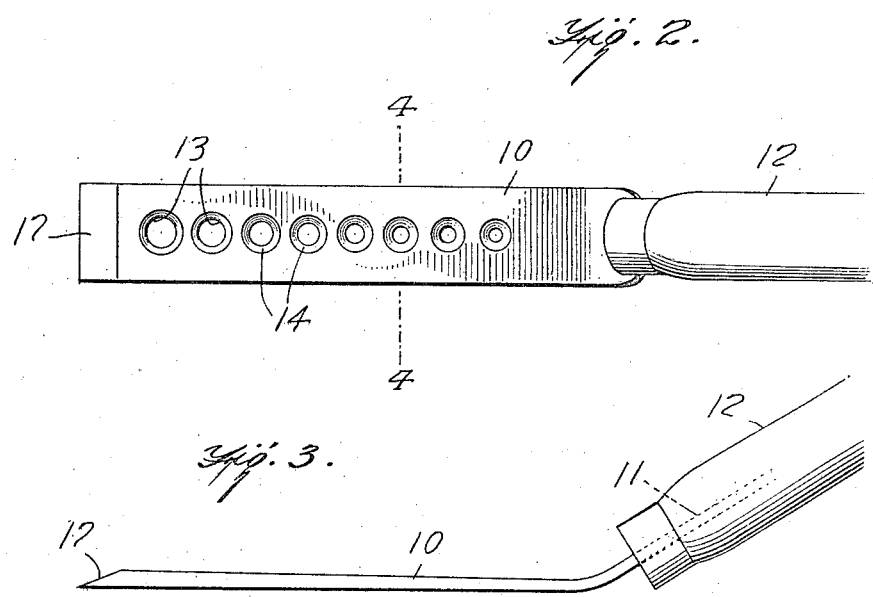
WITNESSES
INVENTOR
Hugo B. Schmidt,
BY
ATTORNEYS

UNITED STATES PATENT OFFICE.

HUGO B. SCHMIDT, OF CHARLESTON, SOUTH CAROLINA.

JEWELER'S TOOL.

1,240,783.  Specification of Letters Patent.  Patented Sept. 18, 1917.

Application filed May 17, 1917. Serial No. 169,286.

*To all whom it may concern:*

Be it known that I, HUGO B. SCHMIDT, a citizen of the United States, and a resident of Charleston, in the county of Charleston and State of South Carolina, have invented a certain new and useful Improvement in Jewelers' Tools, of which the following is a specification.

My present invention relates generally to jewelers' tools, and more particularly to a tool employed in handling the jewel bearings of watches, especially in the cleaning thereof, my object being the provision of a simple, inexpensive implement of this nature which will effectively engage and hold the jeweled bearings and prevent their accidental displacement and loss during the cleaning operation.

A further object is the provision of an implement whereby jeweled bearings of the nature above stated may be held in such manner as to provide for more effective cleaning as well as convenient manipulation thereof including their reversal from one side to the other.

In the accompanying drawings illustrating the implement proposed by my invention:

Figure 1 is a detail perspective view of the implement complete;

Fig. 2 is an enlarged plan view of a portion thereof;

Fig. 3 is a side view of a portion of the implement shown in Fig. 2, and

Fig. 4 is a cross section taken substantially on line 4—4 of Fig. 2, illustrating a jeweled bearing operatively engaged by the implement.

Referring now to these figures, my invention proposes an implement consisting of an elongated flat blade 10 having substantially parallel side edges, and having at one end an upwardly inclined shank 11 provided with a handle of any suitable form, as for instance, the handle 12 engaged upon the shank.

In accordance with my invention the blade 10 has a longitudinal series of openings 13 in line with its longitudinal axis, and successively increasing in diameter from one end to the other of the series, in order that provision may be made for use of the implement in connection with jeweled bearings of various sizes, each of the openings 13 being provided with enlarged countersunk portions 14 adjacent the upper and lower surfaces of the blade 10, as particularly seen in Fig. 4, so as to provide not only for the effective reception of the jeweled bearings, one of which is seen at 16 in the figure mentioned, but the effective cleaning of the bearings from the upper surface of the blade as they are held in the manner shown.

The blade 10 is furthermore provided at its outer free end with a beveled and sharp transverse edge 17, which extends the full width of the blade and constitutes an effective means for engagement with the jeweled bearings 16 to turn or reverse the latter in cleaning both sides thereof, the edge 17 being introduced beneath the annular edge of the bearing 16, so that upon an upward movement the bearing may be readily turned over.

It is obvious that by the use of a tool as at present shown, jeweled watch bearings which are quite small and readily lost or misplaced, thus causing a considerable loss of time in their recovery, may be effectively held during the cleaning operation and their displacement and loss prevented. The practice at present is to hold the jeweled bearings with tweezers during the cleaning operation, and it is obvious that in addition to the above advantages, the fact that the bearings are more readily held in place by my implement provides for more effective cleaning of the bearings themselves.

I claim:

1. An implement of the character described for cleaning watch bearings, including a flat elongated and relatively thin blade having an inclined handle at one end, and provided in its length with a series of openings, of different diameters having countersunk portions at the upper and lower surfaces of the blade, for the purpose described.

2. An implement of the character described comprising an elongated flat blade having a handle at one end and provided with a series of openings extending therethrough and in line with its longitudinal axis, having countersunk portions at the upper and lower surfaces of the blade, said openings gradually increasing in diameter from one end of the series to the other.

HUGO B. SCHMIDT.

Witnesses:
M. R. HIRSCH,
NATALIE HUFFMAN.

Copies of this patent may be obtained for five cents each, by addressing the "Commissioner of Patents, Washington, D. C."